(12) United States Patent
Busse et al.

(10) Patent No.: US 8,433,445 B2
(45) Date of Patent: Apr. 30, 2013

(54) METHODS FOR CONTROLLING ELECTRICAL DEVICES USING MOTION DETECTION

(75) Inventors: Erik Busse, Altenburg (DE); Wilhelm Prinz Von Hessen, Radebeul (DE)

(73) Assignee: Silicon Micro Sensors GmbH, Dresden (DE)

( * ) Notice: Subject to any disclaimer, the term of this patent is extended or adjusted under 35 U.S.C. 154(b) by 332 days.

(21) Appl. No.: 12/910,959

(22) Filed: Oct. 25, 2010

(65) Prior Publication Data

US 2011/0098868 A1 Apr. 28, 2011

(30) Foreign Application Priority Data

Oct. 23, 2009 (DE) .......................... 10 2009 050 574

(51) Int. Cl.
*G06F 1/32* (2006.01)
(52) U.S. Cl.
USPC ............. 700/275; 700/13; 702/152; 702/153; 702/159; 701/49; 713/323; 340/5.72
(58) Field of Classification Search .................... 700/13, 700/22, 275, 302; 702/150, 152, 153, 155, 702/158, 159; 701/49; 713/320, 323; 340/5.72
See application file for complete search history.

(56) References Cited

U.S. PATENT DOCUMENTS

| | | | |
|---|---|---|---|
| 6,856,919 B1 * | 2/2005 | Bastian et al. .................. 702/40 |
| 7,071,817 B2 * | 7/2006 | Haelsteiner et al. ... 340/426.28 |
| 8,077,011 B2 * | 12/2011 | McBride et al. ............. 340/5.72 |
| 2005/0168322 A1 * | 8/2005 | Appenrodt et al. .......... 340/5.72 |
| 2009/0030579 A1 * | 1/2009 | Takehisa ......................... 701/49 |
| 2009/0164072 A1 * | 6/2009 | Vaysse et al. .................. 701/49 |
| 2010/0007801 A1 * | 1/2010 | Cooper et al. ................ 348/730 |
| 2012/0253739 A1 * | 10/2012 | Konishi ........................ 702/150 |

* cited by examiner

*Primary Examiner* — Ryan Jarrett
(74) *Attorney, Agent, or Firm* — Heslin Rothenberg Farley & Mesiti P.C.

(57) ABSTRACT

A method and device to control electrical devices using motion detection are presented, through which an object inside a monitoring area which is subdivided into a pre-detection area and a detection area is successively identified as well as verified in the detection area for reducing power input in standby mode and during operation in the main cycle using distance measurements and its position consequently determined. During the course of the distance measurements, the control device is brought into a readiness state and later on into operating state. After finishing the distance measurements and determining the position of the object in the detection area, an output signal which serves to control an external electrical device is generated by a control device.

12 Claims, 6 Drawing Sheets

FIG 4B

METHODS FOR CONTROLLING ELECTRICAL DEVICES USING MOTION DETECTION

CROSS REFERENCE TO RELATED APPLICATIONS

This application claims priority of German application No. 10 2009 050 574.1 filed on Oct. 23, 2009, the entire disclosure of which is hereby incorporated herein by reference.

The invention generally refers to a control of electrical devices on the basis of a three-dimensional motion detection of objects in a monitoring area. It refers in particular to a for this purpose used control device using a suitable motion detector which provides information on distances and local resolution as well as a method for controlling external electrical devices using such a control device.

BACKGROUND OF THE INVENTION

It is known that the presence of people in a specific detection area inside a room can be detected by means of various motion detectors with electro-magnetic radiation and sound waves, and to control a connected external electrical device by means of the detection. Generally in this case, the switching on lighting or cameras is known which are combined with a motion detector and which are activated as soon as the detector identifies an object inside the monitoring area, commonly defined as event. However, more complex systems are controlled using motion detection, e.g. control of robots within automatic plants without colliding. Conditions for this are that following the motion detection an output signal is generated which can be used for controlling the connected device. As the output signal is normally of an electrical nature where necessary by means of different transformations, the to be controlled external device using such signal shall in the following be defined as an electrical device.

Wherein active motion detectors have an artificial source that produces electro-magnetic radiation and sound waves to detect changes of the current situation inside the detection area, passive motion detectors use sound waves that are present with or without the presence of a person inside the detection area.

Passive detectors can be in particular infrared motion detectors which operate with far-infrared detector, and which uses the heat that a person inside the detection area radiates. The change of radiation of heat that is associated with the movement of a person induces an electrical signal in the sensor of the motion detector which by a suitable preparation of the signal for the use in a subsequent circuit stage is often provided to the actuator of a control circuit such as for switching and dimming of lights which is dependent on the brightness of the surrounding.

Passive motion detectors are also so called Reichardt-Detectors that detect changes of the light in the surrounding. In this case, movements are locally resolved, i.e. the direction of a movement is detected by delaying and linking signals to one another from several at least two adjacent detectors. Such a motion detector is called EMD-Sensor (Elementary Motion Detector; EMD).

Through the use of several EMDs, a directional and speed specific signal is to be sustained, and a complete half-space is to be covered through a suitable arrangement of an EMD within an EMD array. For instance through that, the speed, also angular speed, as well as the direction of movement of an object approaching a vehicle are determined in vehicle assistance systems.

For active motion detectors, various signals are used of whose reflection at an object, the presence of the object in the monitoring area or its movement as well as various other values are identified. There are known motion detectors that can determine distance, speed and acceleration of an object by the use of ultrasound pulses which are emitted from the detector that make use of the Doppler principle by measuring the time delay.

A three-dimensional object recognition, which also comprises information on the distance to the object, often takes place using stereoscopic cameras or scanning systems which however are very complex and costly. Also, objects can be displayed in a three-dimensional way by measuring the time delay of the radiation that is emitted from a pulsed radiating source.

Time delay measurements are realized using methods of measuring pulses or by determination of modulated light from phase shifting. Whereas for the method to measure pulses, time delays between the light pulses are evaluated which are reflected at an object or not, continuously emitted light and changes in the light as a consequence of a reflection at an object is used as a basis of the evaluation of the phase shift.

Detection systems operate continuously, or by manual or automatic initiation through a superordinate main system so that the integration of distance or motion detectors in an operating system such as a driver-assistance system in regards to the operational readiness can take place without any problems. If however the superordinate or main system is deactivated, where need be storage of energy is required to keep the detection system in standby. Because, immobilization times of vehicles can be very long, having the detection systems on standby does not strain the battery too much. But also for the detection operations, the power input shall be reduced because there are a high amount of users in the main system and because of demands for improved energy efficiency.

SUMMARY OF THE INVENTION

A device and method to control external electrical devices are described using three-dimensional motion detection which has a small power input in standby mode as well as during operating the device, and can be used by different users in the main system.

The in the following described method successively and dependent on the previous steps of the method pass through various states which are characteristic of an increase of the power input.

Through defining the various states using in these states carried out measurements, and verifying the necessity of the next higher system state by the current measurable situation in the monitoring area, the necessary power input for controlling the devices could in total be reduced. However, the main system is with starting the main cycle which is used as a basis of the complete control method continuously ready to operate for an immediate control of the external electrical device.

In the first system state, a standby mode or sleep-mode, merely single measurements are carried out which have a minimal energie consumption using single and short signals. These measurements serve on one hand the monitoring of the surrounding and the identification of a basically suitable event to if necessary switch over into the next system state which initiates the control. On the other hand, they serve the exclusion of events that are similar to the relevant event and therefore would be basically suitable but should serve the control. The exclusion takes place with defining the conditions which the prior identified event has to fulfill to be further verfied as relevant.

The reduction of the energy consumption during continuous provision of readiness of the control device through a staggered method with identification, verification and exclusion criteria is supported by the subdivision of the monitoring area into a pre-detection and detection area. Events which are detected in the pre-detection area merely lead to a next step of identification and verification. Therefore, the readiness is provided, however the possibility of an exclusion of an event is even higher here. If the event however is detected already in the detection area the steps until the control is triggered are regularly reduced so that the criteria to exclude events become less important.

This basic course of the method with a staggered system state in connection to a subdivision of the monitoring area in less or more relevant areas is applicable for various kinds of distance measurements. The condition for chosing the detection method is that the distance measurement allows the allocation of events to the pre-detection area and to the detection area. An accurate determination of distance of an event to the sensor is possible, however not required.

Accordingly in one embodiment of the method for a to be carried out distance measurement, a pulse measuring method is used. The following description shall be exemplary but not be restricting using this method.

Both aspects, the identifaction and the verification, take place using similar distance measurements with which merely the presence or absence of a reflection of an emitted light pulse, i.e. of an optical ping that covers the entire monitoring area, is identified inside a measuring window which is adjusted to the dimensions of the monitoring area. Therefore, the effort in regards to time and technology both for the measurement and for the evaluation is reduced. The control device is in a way still in a sleep-mode, but already identifies and verifies.

Even if the identification can take place as well in the pre-detection area as in the detection area, a positive verification is linked to the detection area. To achieve a clear positive or negative verification for the verification measurement with only one measurement loop, a point of time $t_2$ at which the verification measurement should take place is calculated for a positive verification calculated according to another embodiment of the method. For this purpose, a time difference $\Delta(t_2-t_1)$ is calculated within which the event is inside the detection area with a high certainty. This calculation is based on the point of time $t_1$ at which a positive identification took place, an average speed of the event as well as the possible radius of a movement in the monitoring area. The possible radius of movement includes the position of the event at the point of time $t_1$ as well inside the pre-detection are as inside the detection area.

Only if both the identification and the verification are positive, the next subordinate system state, the operating state will be activated, and a measurement cycle will begin. The latter state comprises extensive measurements to determine the position inside the detection area, and thus, has a higher energy consumption. Because of the conditions that had to be fulfilled prior, the operating state is activated however only in obviously relevant situations so that the demand for minimal power input for the entire control method can be met. Also for this step, various measurement methods are suitable.

Energy and technical input can be reduced according to the embodiment of the method, if these measurements also serve the determination of the position of the event inside the monitoring area where controls are initiated and for that purpose, movements have to be locally and temporally accurately identified using pulse measuring methods, and where consequently the evaluation of the pulses that reflected at the event takes place. Only if, independent of the used method of measurement, the position measurement also meets the pre-defined conditions, the control of the external electrical device takes place. This additional method of exclusion, which is restricted to the detection area, serves both the protection against and as well the energy conservation because of an unintentional initiation to generate the output signal.

The actual control of the external electrical device, i.e. an electrical device outside the control device, takes place using an analogue and evaluable output signal which is generated in the control device and transmitted to the device. Therefore, a run through of the control method is completed so that the main cycle is finished and the control device can be put in hibernation. In this state, no further measurements take place.

The generation of the output signal takes place only after a complete finish of the prior measurements so that according to the embodiment of the method further reductions of the energy input are possible by deactivating the function block of the control device which serves the distance measurement and shall be designated as the distance block before the generating of the output signal.

If, as described further above, in one embodiment of the control method the pulse measuring method is used, a determination of the position is possible in a simple way via a comparison of the parameter of the reflected pulse with a given measurement range. Also, the determination of the position has only to be as accurate as defined by the size of the detection area.

Because there is to be a comparison with stored measurements for several of the described method steps, a compensation of the fluctuations in the brightness of the surrounding is beneficial by means of their determination as optical noise. The minimization of the technical input also serves the measurement of the brightness of the surrounding using pulse measuring methods. Therefore, it is possible to use the components of the control device which are used for the actual measurements also for this measurement.

Another embodiment of the control method makes it possible to link the generation of the output signal per se or in regards to its kind to a concrete action of the event. This takes place through a locally and temporally selected detection of a motion sequence of the event inside the detection area which occurs by means of a function block for locally and temporally selected detections of motion sequences, in the following designated as motion block.

Only the evaluation of the detected motion sequence leads to a decision about the output signal. Thus, another criteria to exclude can be implemented before the generation of the output signal, or various output signals can be generated through a method and device. These can control one external electrical device or several devices separately.

Basically, various detection methods can be used for this motion detection. The use of the device which is used for distance measurement where necessary with modification of the configuration and/or with adapted optical emitters is possible, as long as in one embodiment of the method, the locally and temporally selected detection of motion sequences takes places by means of sensing the changes of the brightness values of an arrangement of photo diodes as a consequence of a motion sequence.

In doing so, the motion detection occurs by means of sensing the brightness of the light which changes during a motion sequence differently for each photo diode of the diode arrangement of the control device. The motion sequence can be reproduced by the comparison of the currents induced in the single diodes. In suitable evaluation electronics, the preparation of processing of the signals of the single photo diodes takes place to identify the motion sequence, e.g. a movement of a hand downwards or of a foot towards the sensor. With the help of a decision logic, the generation of an output signal takes place which is specified for the detected motion sequence.

The use of photo diodes makes motion detection in low light, restricted by noise, and over a wide range of wave lengths possible.

The resolution of the solid angle of the incident light and its changes in intensity take place via a linear or reticular arrangement of several photodiodes. Such an arrangement can occur, for instance through suitable distances between the photo diodes or the formation of a curved incidence area of the entity of the photo diodes. Alternatively or complementary, the photo diodes can have a corresponding arrangement of optical components assigned to, e.g. a superordinate linear system and a surface structuring of photo diodes. In latter case, said optical components are integrated in the photo diode arrangement.

Using these or complementing optical components, adaptions to certain measurement condition are possible, such as e.g. a filtering or a selection of defined light incidence angles or preferred directions.

Furthermore with changes in intensity of the incident light, the detection of a motion sequence allows a local separation of the control device and the monitoring area. An optical link through transparent partition walls is only necessary. The motion sequences therefore can be carried out, whether in a separate only optically connected area or not, as well by a person as by a device, in latter case for instance to control or initiate automated operations.

In contrast to the distance that serves to measure distances, the described motion block is to be operated as passive detector so that in contrary to recording the motion sequences using a camera according to the state of the art, considerably smaller quiescent currents can be achieved. As long as the surrounding light is however too low, a minimal value can at least be adjusted according to another embodiment of the method during the detection by using an additional light source.

The temporal separation of distance measurement and motion detection allows further energy reductions of single function blocks, to only activate the one that is in use. Additionally, the photo diodes of the control device can be activated as solar cells and can serve the energy production for the period of time of the hibernating state in which the diodes are not used for the control method.

For the realization of the method, a control device is given which has following basic, structural components. The control device comprises an optical emitter for emitting light into the monitoring area. The optical emitter is an indispensable component for the distance block according to the above description of the method, however can only optionally be connected for the motion block. Accordingly, the optical emitter is operatable both continuously and in pulse operation. Alternatively, several optical emitter can be arranged which possibly differ in their ranges of wave lengths for the above described differing functions in the distance and motion blocks, or for the use in various applications.

The control device comprises further an arrangement of several, at least two rows of arranged photo diodes, e.g. PIN- or avalanche diodes as optical detectors to receive radiation which impinge on the diode arrangement as a consequence of reflecting at an object in the monitoring area.

Furthermore, control electronics are arranged to control the optical emitter and the optical detector so that the optical emitter emits pulses of various lengths and/or intensities and/or timing. Using the control electronics, it is realized that in addition, some of the optical emitters are either one after the other assigned to the measurement system for distance measurements, the distance block, or to the measurement system for locally and temporally selected detection of motion sequences, the motion block.

The control device also comprises evaluation electronics for the evaluation of emitted and/or received radiation, for storage of characteristic values of light pulses as well as of distribution characteristics of the photo diode currents which across the area of the diode arrangements are selected temporally and area-like, and for a comparison of detected and stored optical signals as well as distribution characteristics For generating the required, if necessary varying output signal, a signal generator is also arranged through which an output signal to control an external electrical device is created, and which is to be transmitted to the external electrical device.

As a consequence of the respective control by the control electronics, these components form both of the function blocks which are assigned to the respective system states. As both function blocks operate independent from the other, i.e. without access to the other one, both the separated structures and the use of components of the control device is possible for one and at a later point of time for the other function block. To make an adaption of the control device to various applications possible, the diode arrangement can comprise several photo diodes as required for both function blocks. Such an adaption can involve, e.g. the dimensions or the form of the monitoring area. In such a case, one part of the diode arrangement can after the adaption be firmly connected to one of the function blocks and another part can firmly be connected to the other function block, or can be assigned to an additional function such as the adaption of the surrounding light.

The proposed control device can further be realized as a compact sensor-IC, i.e. a complex component of a system in which in one embodiment essential components such as the optical detector and the optical emitter as well as the control and evaluation electronics and the signal generator are monolithically integrated, i.e. the area arranged on a semiconductor chip. Therefore, the control device can be used variously, and a considerable reduction of measurements is possible in opposition to an embodiment with single components that are built discretely on a circuit board. Currently, a reduction up to an eighth of the base area can be realized wherein the connection occurs via electrical connectors that are arranged at the side of the housing. With increased scaling but also depending on the location of use, small measurements are still possible. As long as in an optional embodiment the discrete structural version is used, the electrical connectors, e.g. the pins, are arranged on the sensor side of the circuit board while the components of the of the control device can be arranged on both sides.

DETAILED DESCRIPTION

The realization of the in the following described method of control is based on a housed sensor chip 1 according to FIG. 1.

Figure 1:
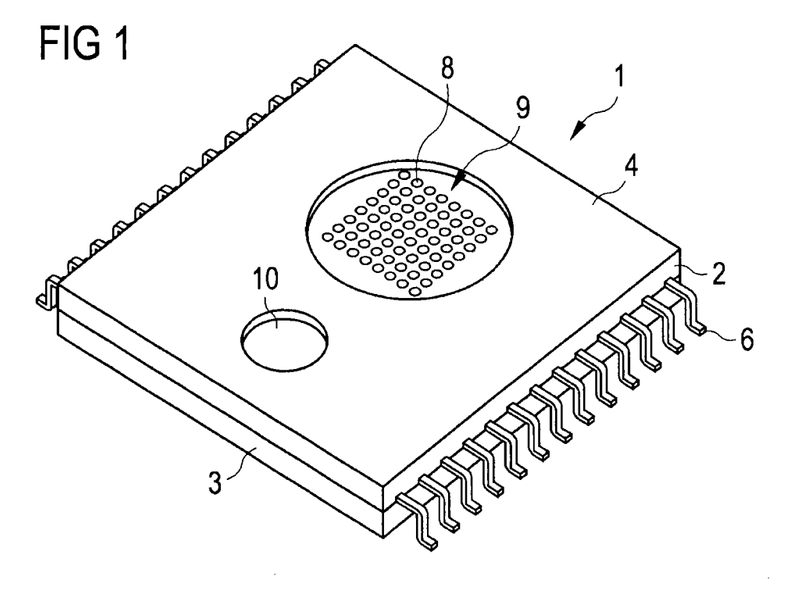
FIG. 1 a housed sensor chip as a monolithically integrated control device.

FIG. 1 shows an embodiment of a sensor chip 1 according to the invention within its package 2. Package 2 can generally be understood as the chip's direct housing which often is consists of a grouting compound that meets the electrical and mechanical requirements whose material is attuned to the expected chemical and thermal strain. The package 2 in this embodiment is generally defined as QFP-housing (Quas Flat Package-housing) shaped as a flat rectangle whose electrical connectors 6, generally designated as pins, are arranged at the side edges. With such a shape and realization of connectors, the sensor chip 1 can be integrated into different systems through a suitable housing.

The package 2 is made opaque with a transparent cap 4 above the optical detector, a in the following described arrangement of photodiodes, and the optical emitter 10. The opaque cover 3 and transparent cap 4 are solid in operating temperatures within a range of −40° centigrade and +105° centigrade. Cap 4 in this embodiment consists of optionally macrolon or aspec, which are both materials that have a sufficient transmission and are sufficiently temperature-resistant for the use of sensor chips 1 in automobiles.

Cap 4 or a specific cover for the optical emitter 10 and/or the photodiodes 8 can be carried out as filters for specific wavelength ranges that is used for three-dimensional motion detection and/or as a diffusing plate to obtain a spatial diffusion of the from the optical emitter 10 emitted light, and thus, to cover the entire monitoring area with only one ping.

The sensor chip 1 contains a photodiode arrangement 9 of eight times eight semi-conductor photodiodes as the active components which, for instance, are carried out as avalanche-photodiodes. Through the amplifying effect of the avalanche-photodiodes 4, a confinement to a small area of the active space of diodes that are used is possible. Through this, the area that is needed for the sensor chip 1 can be reduced. The use of avalanche-diodes makes a compensation of a reflection loss possible as a result of the diffusing plate even with a high scattering effect because of the diodes' amplifying effect. Alternatively, PIN-diodes can be used, for instance, if the integration of the sensor chip 1 into the main system does not require a maximally possible reduction of the area.

The diode arrangement 9 serves the measurement of the distance as well as the locally and temporally selected motion detection by activating or where necessary, configurating the respectively for this purpose used photodiodes 8 with the activation of the for the different measurements responsible functional block using the software of the sensor chip 1. The amount and arrangement of photodiodes 8 that is used for a functional block can be the same for each embodiment but also can differ from each other. The photodiodes 8 are laid out per se or through suitable light filters preferably in near infrared range, in this embodiment within the range of 840 nm to 860 nm. The photodiodes 8 serve both the measurement of the distance as well as the locally and temporally selected motion detection according to the respective activation of the functional blocks.

The sensor chip 1 further comprises a LED as an optical emitter 10. Alternatively, other optical emitter 10 or more than one can be used, for instance laser diodes or infrared emitter diodes. For the measurement of distance, the LED can be controlled in pulses so that single as well as sequences of pulses with an adjustable pulse width and intensity can be produced. The wave lengths of the light that is emitted from the optical emitter 10 lie for the above noted wave length range of the photodiodes 8 within visible to near infrared light, i.e. within a range between 700 nm and 950 nm.

Furthermore, the sensor chip 1 comprises an application-specific integrated circuit (not visible in FIG. 1) for signal conditioning, evaluating the detected signals, and for producing analogue output signals that can be evaluated. The photodiodes 8, the optical emitter 10 and integrated circuit are monolithically integrated.

Figure 2:
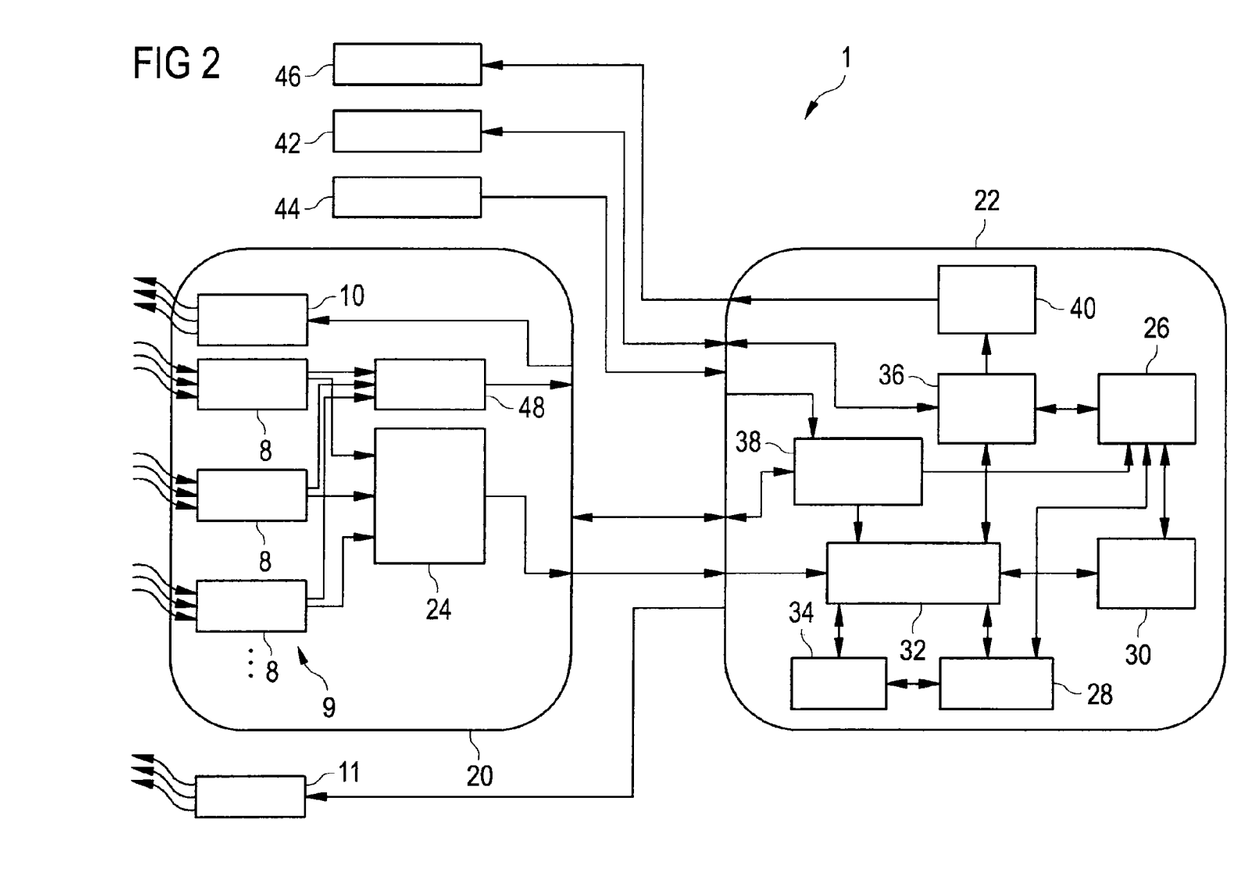
FIG. 2 a block circuit diagram of a sensor chip according to FIG. 1.

The block circuit diagram according to FIG. 2 shows the essential components of the sensor chip 1, wherein the presented separation but only the functional not structural separation of the embodiment shall be documented.

In regards to functions within the sensor chip 1, it is to be distinguished between detector 20 and integrated circuit 22. The detector 20 comprises the photodiodes 8, of which there are only three schematically presented, the optical emitter 10 as well as a signal digitalization device 24. The latter comprises commonly a transimpedance amplifier (not presented) to convert the photo current into a low resistant measurable current as well as a the transimpedance amplifier following A/D converter (not presented). In this way, a sufficiently fast measurement with a high cut-off frequency and a high linearity in the illumination field of the photodiodes can be achieved, the functional connection between illumination and diode current.

The integrated circuit 22 comprises components of the control electronics which serves the signal conditioning for signals that are emitted, components of the evaluation electronics to process and evaluate received signals, components of internal power supply as well as of the external communication through which an output signal is generated to control an external device.

Part of the control electronics is a signal conditioning device 26 through which in connection with a timing device 28, the point of time as well as length and/or intensity of a light pulse are controlled. These components serve in connection with a non-volatile memory 30, in which the programming for the course of the method, characteristic signal values and measurements, evaluation routines and further data that is required for the realization of the control method are permanently and configurably stored, the control of the optical emitter 10 or if need be several of them.

The evaluation electronics comprises a processor 32 for evaluating the signals in connection with a volatile memory 34, and refers to the timing device 28 as well as the non-volatile memory 30 for the purpose of evaluating the signals.

Both the evaluation electronics, in this instance in particular the processor 32, and the signal conditioning device 26 can be contacted and programmed via an interface 36, which serves the external communication, from the outside via a route within the sensor chip 1 and by engaging its electrical connectors 6 to adapt the emission and evaluation of signals to the respective application of the sensor chip 1. Access to the detector 20 is also realizable via the interface 36.

Furthermore, the integrated circuit 22 comprises an internal power supply 38 which serves in particular to supply power to the processor 32, the signal conditioning device 26 and the detector 20. This is in reverse optionally connected with the detector 20 whose diode arrangements 9 are connected with capacitors 48 (schematically presented is only one). The latter serve the storage of energy by charge via the diode arrangements during hibernation of the control device. However, one of the capacitors 48 is also used at the start of the control method to identify the light of the surrounding as an optical noise as described below more in detail.

The integrated circuit 22 has as signal generator 40 a microprocessor preferably a digital signal processor (DSP) to provide a regularly to a user adapted output signal which controls the external electrical device 46. The digital signal processor offers the possibility of an adaption mostly using a software of the output signal to the control of an external electrical device 46.

The sensor chip 1 is connected with the main system, e.g. the vehicle, via a data communication 42 which serves the entry and transmission of data, and via the system power supply 44 to supply power to the sensor chip 1.

The described components of the sensor chip 1 serve in respect to various in the non-volatile memory stored configurations, the successively different functional blocks. Therefore during a control method which is described more in detail in the following, the distance measurement of a selectable arrangement of in this embodiment eight times eight photodiodes 8, the signal digitalization device 24 and the integrated circuit 22 by means of pulse measuring methods using light pulses of emitting optical emitters 10. The here mentioned functional block shall be designated in the following as distance block.

After the distance measurement, locally and temporally selected motion detection can take place that is dependent on the realization of the control method using a so called motion block. This functional block comprises a configurable diode arrangement 9 and likewise, the signal digitalization device 24 as well as the integrated circuit 22 in this case however with a respectively adapted signal evaluation. An optical emitter 10 that served the distance measurement prior is not used for the motion detection.

Optionally in case the light of the surrounding falls below a value that does not lie within the non-linear range of the illumination field of the used photodiodes 8, the optical noise is increased during the detection using a light source 11. The light source 11 can be separate but linked to the sensor chip 1 or formed on said chip.

The amount and location of the respectively used and accordingly activated photodiodes 8 depend essentially on for both functional blocks the size and location of the to be covered area that is to be monitored. For instance, if the entire monitoring area 50 (FIG. 3) is to be covered, a greater amount of photodiodes 8 can be necessary than for measurements in the detection area 54. If the area that is to be covered extends differently into different directions, only single rows of the diode arrangement 9 can be activated. Accordingly for measurements in the pre-detection area 52, other arrangements of activated photodiodes can be used than for measurements in the detection area 54 or in the monitoring area 50. By saving, the transition of activation during a control method can take place even for immediately following measurements or detections.

Additionally for wiring the detector 20 as motion block, the single photodiodes 8 or one row of them can be used for the detection of specific movements to eliminate that these accidently lead to a control of the external electrical device 46.

Similar to the activation of photodiodes 8 that can be freely selected for various applications, one or more optical emitters 10 can be arranged which are controlled together or separately according to their performance parameters, the wanted wave length, or the measurement or rather detection that is to be carried out. In FIG. 2, merely an optical emitter 10 is presented for a better overview and not restricting.

Figure 3:
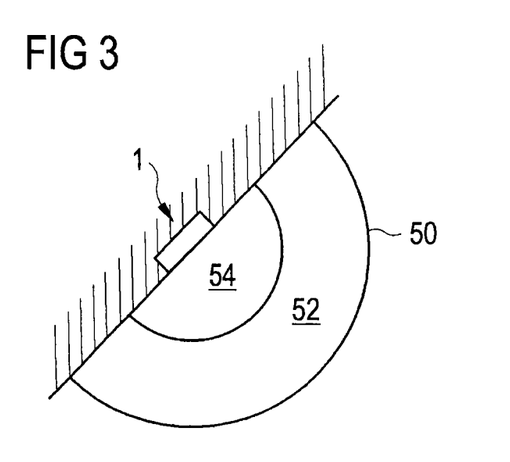
FIG. 3 the location of a monitoring area in respect to the location of a sensor chip.

FIG. 3 presents the location of the monitoring area 54 relative to the location of the sensor chip 1 for an exemplary illustration. The area that directly surrounds the sensor chip 1 is the detection area 54. It is sized in a way that movements within are clearly executable, detectable and identifiable to carry out a control based on these movements through a method that is described in the following. However, it needs to be as small so that expected similar movements that shall not initialize any control can be excluded. For example with opening the door of the vehicle, it is to be ensured that passing pedestrians do not trigger the control accidently.

Attached to the detection area 54 is the pre-detection area 52 which is sized in a way that there is sufficient time to carry out verifications of events and activations or deactivations of various operating states. Both areas 52, 54 create together the monitoring area 50 as presented here as an outer line. Dependent on the expected events, both areas 52, 54 can be located differently in relation to each other or to the sensor chip 1. Also, a contact in some sections or a complete separation of both areas 52, 54 is possible.

Figure 4A:
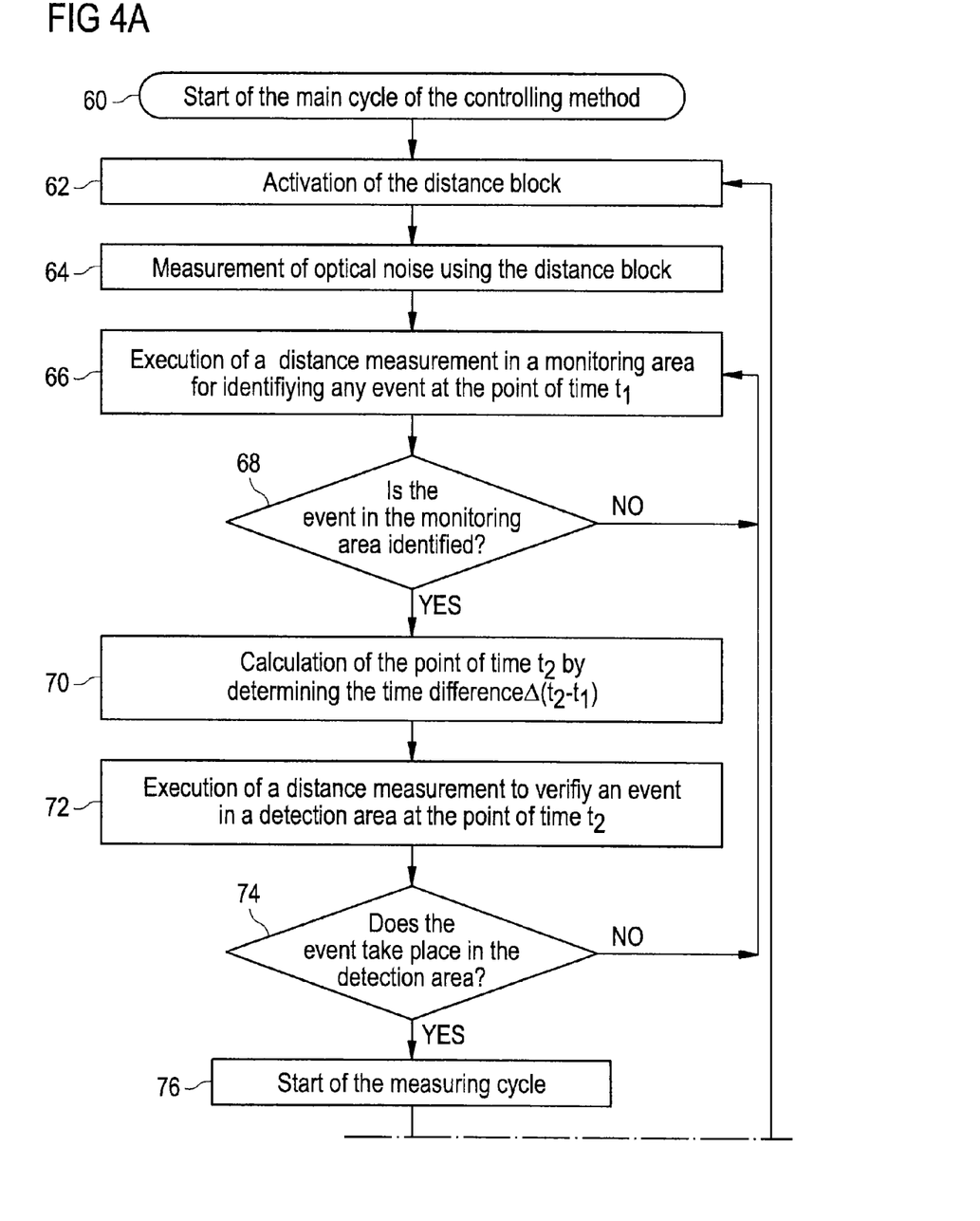
FIG. 4A, 4B a flowchart to execute the method according to the invention to control external electrical devices.
Figure 4B:
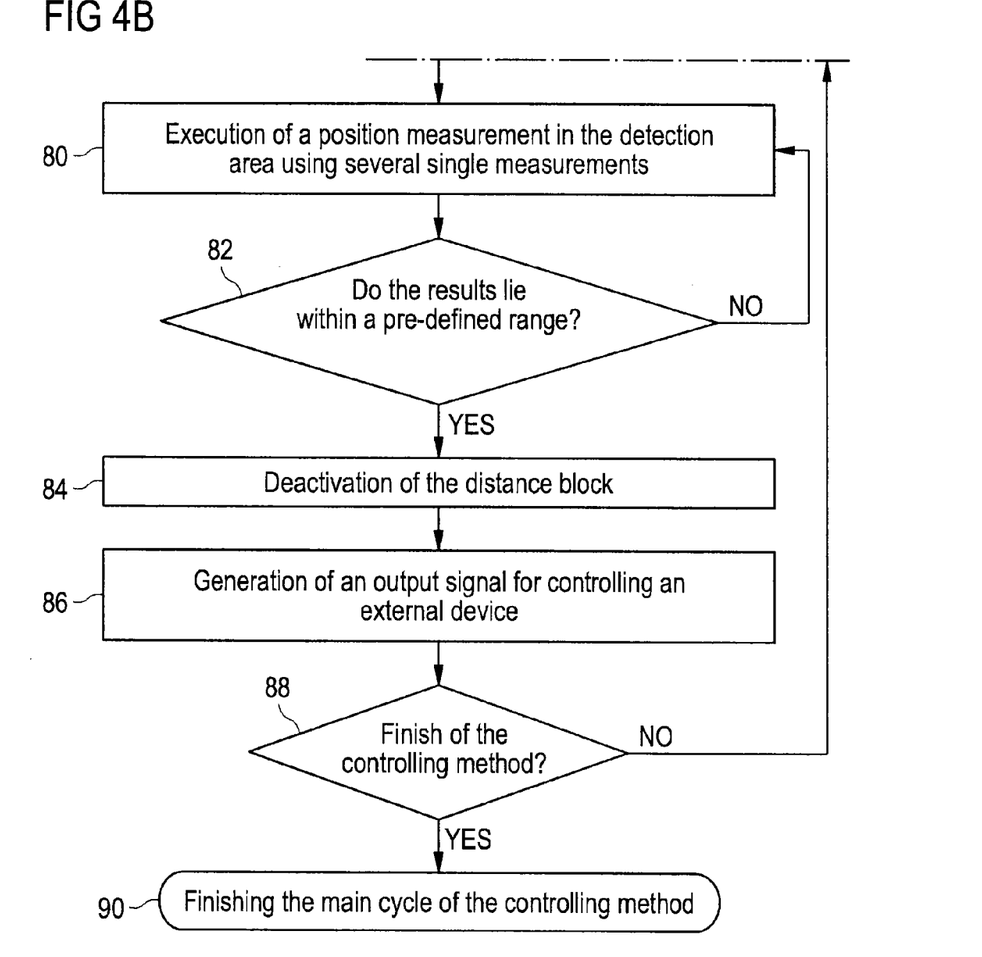

A control method using a previously described control is presented in the flow chart according to FIG. 4A in connection to FIG. 4B.

The control method begins with the start of its main cycle 60. That brings the distance measurement system from hibernation into standby by activating the functional block 'distance' of the sensor chip 1 according to its stored configurations 62. No data communication 42 with the main system is required as the entire antecedent course of the method is stored in the sensor chip 1. Depending on the embodiment of the sensor chip 1, the power supply takes place either completely via the system power supply 44, or at least for the first distance measurements via the discharge of the capacitors 48 of the sensor chip 1. In one embodiment of the method, the power input during hibernation lies within a range of a few hundred microamperes.

If the control method shall refer to the opening of a locked door of a vehicle the main cycle can be arranged respectively. In the simplest case, the main cycle will have already begun with the locking of the vehicle so that at this point the control device is ready to unlock the doors again. In a more energy efficient version, the detection of the vehicle key that is provided with a transponder can be used for the start-up within the area of a correspondent emitter.

A first measurement of the distance takes place through the functional block 'distance' which is designated in the following as distance block for identifying the optical noise 64. For that purpose, a light pulse, for instance, of a length of approximately 10 nsec is emitted using the optical emitter 10. The light pulse serves only the temporal control of a measuring window during whose course of time a capacitor 48 is charged through background radiation which is received by at least one of the photodiodes 8. After the measuring window has closed, the charging of the capacitor is interrupted, and the optical noise which was generated by the background radiation is determined by the capacitor voltage. Independent from the rest of the method, the optical noise is measured once again in pre-defined time intervals to take in consideration their change during the distance- and motion detection.

Following, a first measuring of the distance takes place 66 using the distance block which serves the identification of events, i.e. the presence of an object in the monitoring area 50. This also takes place by sending a light pulse, the identification ping, which for instance can be 5 to 8 nsec long, and by receipt of the emitted radiation using the photodiodes 8 as long as there is an object in the monitoring area 50.

Via the timing of the measuring window, i.e. its start and end in regards to sending the identification ping, during which the photodiodes 8 are active, it can be selected whether the object is in the monitoring area 50, the pre-detection area 52 or in the detection area 54. Start, length and end of the measuring window are adjusted to the for each area different run times of the emitted pulses. In that way, the different areas can be monitored using an identification ping through the definition of various measuring windows for different photodiodes 8 of the diode arrangement 9. That first measurement serves merely for the identification of an event, and is designated in the following as identification measurement. If the identification measurement does not detect an event, it will be repeated regularly and in pre-defined intervals until the measurement is positive. The point of time of a positive identification measurement is called $t_1$.

By means of the dimensions of the pre-detection area 52 and the detection area 54, and the average speed of an expected event, the difference in time $\Delta(t_2-t_1)$ and from this the point of time $t_2$ is determined 70 at which the object will certainly be in the detection area 54. This calculation of the point of time $t_2$ is based on that a certain event should intitiate the control of the electrical device, e.g. a person approaching a vehicle. In this way, the average speed can be relatively accurately limited either by general standard values or by statistically evaluated measurements. In this case here, the average speed of 1 msec emerged as appropriate.

Further, the calculation is based on that for certain the event is still in the detection area 54 at that speed, and for both cases that it was at first identified in the pre-detection area 52 as well as in the detection area 54. In connection to the application as above, it has to be considered that, e.g. other passing road users move at a different speed, and on approach do not slow down.

In a similar way, marginal conditions that allow a verification of a previously identified event as relevant for the control are to be determined for the various expected situations in the respective applications. Important however is that the event in the detection area 54 is verified as this is conditional for a later control of the electrical device 46.

The verification is done through another distance measurement similar to the identification measurement with a light pulse of a similar length, the verification ping, however at the point of time $t_2$ 72. In this instance, the location and measurement of one or several measuring windows is to be done in reference to the verification ping so that the event without doubt is localized in the detection area 74. If the verification measurement is negative, i.e. the event is not in the detection area 54 which includes the removal of the object from the monitoring area 50, the prior identification measurement at the point of time $t_1$ will be discarded, and the cycle until a positive identification measurement is obtained begins anew until the verification measurement is also positive.

Only if this is the case, the operating state with the actual measurement cycle of the controlling method will begin 76. This operating state differs from the prior standby state in a way that only now, the power that is required for the control method is supplied at its highest. The operating state during the identification and verifications measurements in comparison to the latter describes rather a sleep mode whose power input shall have a limit that respective to the embodiment of the method, the power supply is possible from the storage of the diode power alone or at least most of it, which can be obtained using the as solar cells used diode arrangements 9 of the hibernating system. In one embodiment, the power input during standby is limited to a maximum of 20 mA.

The continuous course of the method is presented in FIG. 4B. During the measurement cycle, a measurement takes place which is designated as position measurement 80 in this instance which is composed of several single measurements of the pulse measuring method. For this purpose within a permitted time period, several light pulses are emitted in regular intervals using an optical emitter 10. The permitted time period is to be sized in respect to the above consideration on the expected events. In the above application example, the time period is approximately 5 msec long. Within this time period, five light pulses are emitted which advantageously are, e.g. 5-8 ns long, but do not have necessarily the same pulse width, and which have the same pulse height.

The determination of the position of the event takes place via the measurement and evaluation of the pulse width and/or pulse height of the at the event reflected radiation. Using a statically secured measurement, stimulation or calculation, the expected measurement values are to be determined irrespective of whether the event is inside the detection area 54 or not. To secure measurement results, the position measurement is only then valued as positive, i.e. the event is in the detection area 54, to control the external electrical device 46, if most of the single measurements, at least three of the five light pulses with a pre-defined pulse width and/or pulse height as in the above example under consideration of the last determined optical noise are inside one—or several—areas 82. If this condition is not fulfilled, i.e. the position measurement is negative, it will be repeated.

The pre-defined values are stored in the non-volatile memory 30 of the sensor chip 1 and can be adapted to the respective application of the sensor chip 1 integrated in the main system via the data communication 42.

If the position measurement is positive, the distance block will be deactivated 84. Only then, the actual control of the external electrical device 46 begins. In the embodiment according to FIG. 4B, the generation of an evaluable, analogue output signals 86 takes place using a suitable signal generator and the transmission of the output signal to the external electrical device 46. In this way, either 88 the control method can be finished, which for instance would be applicable when opening the driver's door, or the method remains in the main cycle and begins standby anew with the activation of the distance block and an identification measurement. The latter is applicable, if repeated or other control methods are to be carried out using the same sensor chip 1. If this is not the case, the main cycle will be finished 90 wherein the sensor chip 1 will be brought into its hibernating state.

Figure 5A:
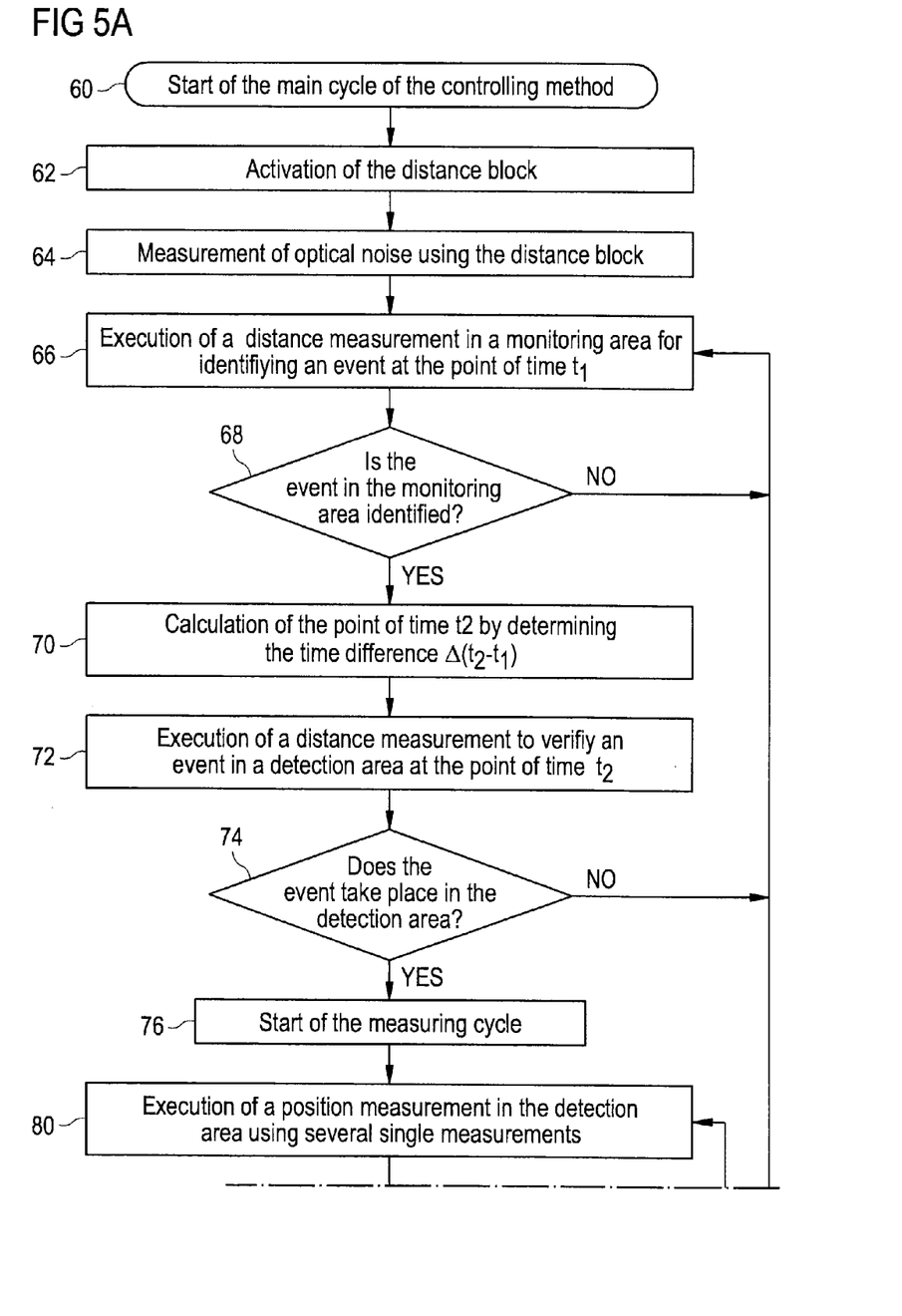
FIG. 5A, 5B a flow chart of an embodiment of the control method according to FIG. 4A, 4B
Figure 5B:
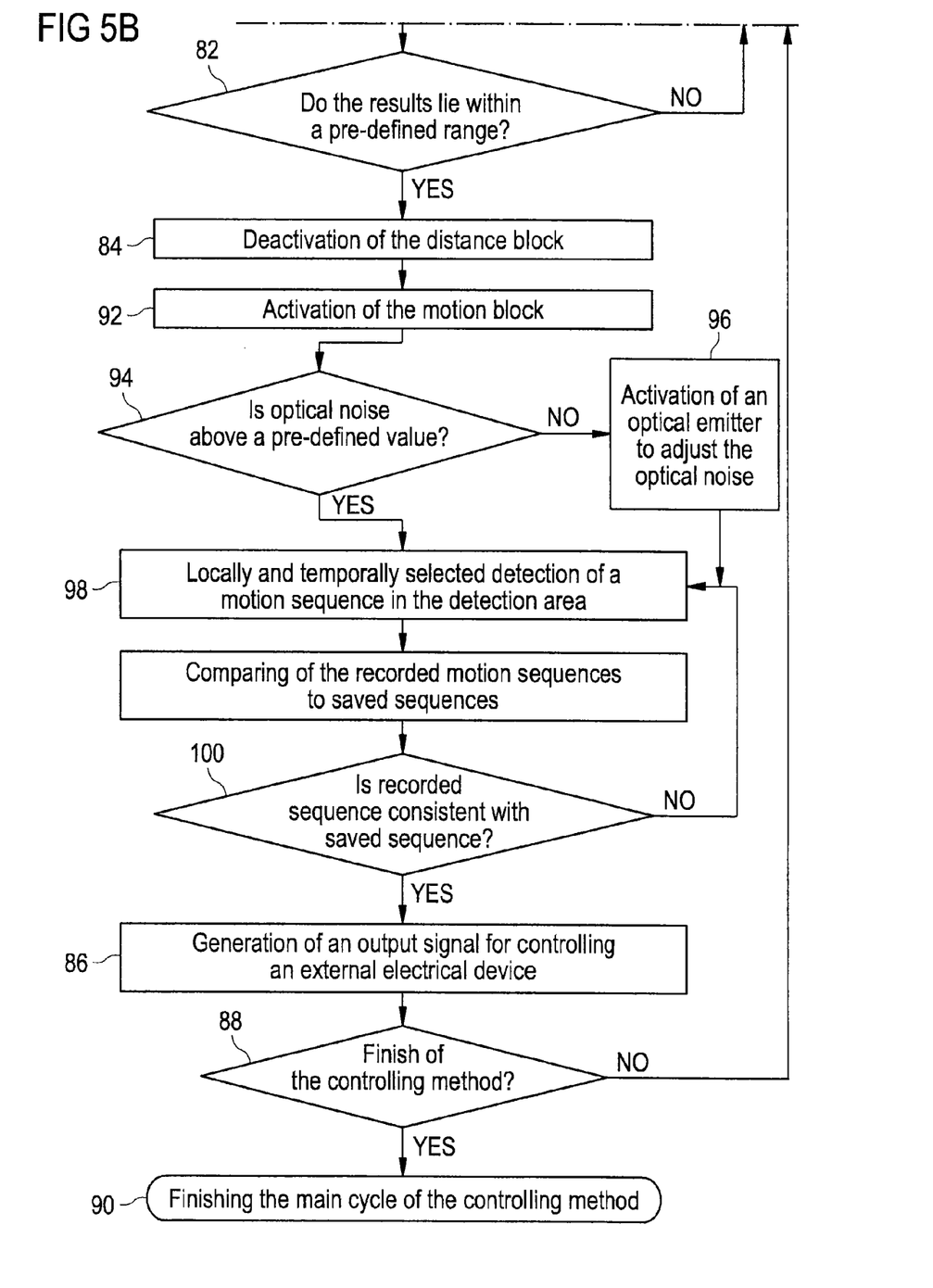

An embodiment of the before described method shall be described on for instance the control for opening a driver's door using FIG. 5A in connection to FIG. 5B, wherein FIG. 5B shows the continuation of the in FIG. 5A described and not completed operation. In a similar way, this method is applicable for the control of other electrical devices also in other than the driving assistance systems.

At first, the initial method steps until the deactivation of the distance block 84 take place as described above for FIG. 4A, FIG. 4B. In this respect, it is referred to the above descriptions and are consistent with the designation of the single method steps in FIG. 4A, FIG. 4B and FIG. 5A, FIG. 5B.

The control method according to FIG. 5A and FIG. 5B differs essentially from the one in FIG. 4A, FIG. 4B in a way that at least one more detections are a condition for generating a signal to provide various options for the signal generation. This can be for instance a further selection of the verified and positionally determined events, or the possibility to connect the kind of the output signal with the additional detection.

For this purpose, the function block 'distance' will be deactivated 84 as described in FIG. 4B after the positively completed position measurement. In this way, the power input of the sensor chip 1 can further be reduced, and the components of the sensor chip 1 which before were used for the distance block can now be configurated and used for the next function.

Through the activation of the detection blocks 92 which in following described embodiment serves the locally and temporally resolved motion detection and is called for this reason motion block, the configuration of the sensor chip 1 takes place, i.e. the activating and connecting of the single components of the sensor chip 1 respective to the new task. The configuration of the motion block is equal to the configuration of the distance block stored in the non-volatile memory of the sensor chip 1.

The motion detection takes place differently from the distance measurement on the basis of determining the changes in brightness as a consequence of in the detection area 54 moving events, i.e. the detection takes place generally passively and will be influenced considerably more through the brightness of the surrounding.

To be able to use the linear area of the illumination field of the photo diodes 8 of the sensor chip 1 in low light, the determined optical noise will be compared to a stored minimum value 94 which essentially will be determined from the diode characteristics and the evaluation electronics at the beginning of the method. If the optical noise is below a pre-defined value, the optical noise will be raised to the minimum value or above using a light source 11, 96. This takes place either permanently or at least during the time in which the motion detection takes place using the motion block. The light source 11 can be connected with the sensor chip 1 or can be built on said chip through which a direct connection to the detection procedure is possible temporally as well as in regards to the intensity. The use of infrared LED in this case has been proven advantageous also because of the low power input.

The optical noise lies because of the additional light source 11 or because of the sufficient brightness of the surrounding above the pre-defined value, the locally and temporally selected motion detection can take place 98.

The motion sequence can either be detected as distribution characteristic of the photo diode currents which through the spatially different brightness values are determined depending on the location of the events relative to the diode arrangement 9 and thus, at the end of the movement in the detection area 54. This characteristic presents in a way a finger print for the detected motion sequence as various sequences at the end lead to clearly distinguishable layers of the event relative to the sensor chip 1. Alternatively, the temporal resolution can be used by means of the diode arrangement 9 as long as such photo diodes 8 are used whose sensitivity and speed is so high that any movement is shown temporally resolvable in spatially different diode currents. For this purpose, e.g. avalanche-photo diodes are used.

In the following using the evaluation electronics, a detected locally and temporally resolved motion sequence will be compared with motion sequences 100, which are stored in the non-volatile memory 30 of the sensor chip 1 as the sequences that are relevant for the rest of the control method. That is the sequences that shall initiate the control of the external electrical device, in the above example of a vehicle system with a kick of a foot when approaching a vehicle tailgate or a waving with a hand in front of a vehicle door to open it.

Otherwise, motion sequences are however stored that occur often and for which it has to be ensured that these do not lead to a malfunction. These can be, e.g. passers-by that remain or move slowly in the monitoring area, movements of growth at the road side, or movements in a car-wash. These excluded motion sequences can be selected solely through the evaluation electronics as described through the comparison using a software 100, or alternatively can be carried out simultaneously and in real time using a part of the diode arrangement 9 which will not be used for the primary, the device control. For this purpose, the diode arrangement 9 is accordingly to be controlled using the control electronics.

For this embodiment of the method, two vertical rows of the above described diode arrangement 9 with eight times eight photo diodes 8 can be used for instance for the primary motion detection and one horizontal row for the latter connector detection. One or more of the remaining photodiodes 8 are to be used, e.g. for the determination of the optical noise also during the detection of motion sequences. Alternatively, the entire diode arrangement 9 and the diode arrangement 9 successively can be used for various tasks. These divisions shall merely indicate for instance the variety of possibilities but should not be considered as a limitation.

If the comparison of the locally and temporally detected motion sequences with stored sequences do not show a match, the motion detection will be repeated until the comparison turn out positive. Only then, the output signal that is required for controlling the external electrical device 46 is generated in the signal generator of the sensor chip 1, 86, and is transmitted via the data communication 42 to the external electrical device 46 as described above.

According to FIG. 4A, FIG. 4B, there is the option at this point to finish the main cycle 90, or to run through it anew. It is referred to these options in the above descriptions.

According to the control method as in FIG. 5A and FIG. 5B, it is possible to keep the power input under the value of 0.5 W throughout the entire method and for a temperature ranging −40° C. to 85° C. The above described control device even withstands temperatures of the mentioned temperature range during operation, and during storage the temperatures even exceed this range.

The invention claimed is:

1. Method to control electrical devices using three-dimensional motion detection of an object inside a monitoring area subdivided into a detection area and an attached pre-detection area, by a detection system that comprises a distance measurement system and a control device, comprising:

starting a main cycle of the control method by bringing the control device from a hibernation state into a standby state if a presence of an object inside the monitoring area is expected, carrying out of an identification distance measurement using the control device that is in standby state at a first time $t_1$ for identification of the object as inside the pre-detection area or inside the detection area, carrying out a verification distance measurement using the control device that is in standby state for verification of an identified object as inside the detection area at a second time $t_2$, starting of a measurement cycle of the control method by bringing the control device into an operating state upon verification that the identified object is inside the detection area, wherein the operating state is characterized by a higher power input than in standby state and the standby state in turn is characterized by higher power input than in hibernation state, and in operating state the necessary highest power possible is supplied for the control method, carrying out a distance measurement to determine a position measurement of the object inside the detection area, starting of control of an electrical device by generating an output signal which serves as a control of the electrical device, and finishing the main cycle of the control method and bringing the control device into the hibernation state.

2. Method to control electrical devices according to claim 1, wherein the distance measurement takes place using pulsed light, and for the identification measurement and/or for the verification measurement respectively only one light pulse is used.

3. Method to control electrical devices according to claim 1, wherein the time difference $\Delta(t_2-t_1)$ until the verification measurement is calculated by determining from the time $t_1$ a probable time $t_2$ at which an object depending on its average speed and length of a possible way inside the monitoring area in the detection area is to be met.

4. Method to control electrical devices according to claim 1, wherein the position measurement takes place using several single measurements with one light pulse each within a pre-defined permitted time period, and the generation of an output signal only begins if a pre-defined amount of measurement results of the single measurements lies within a pre-defined range of measurements.

5. Method to control electrical devices according to claim 1 wherein, before the measurement cycle, brightness of the surrounding as optical noise is determined using pulse measuring method.

6. Method to control electrical devices according to claim 1, wherein a distance block of the control device which performs the distance measurement is deactivated before generation of the output signal.

7. Method to control electrical devices according to claim 1, wherein the control device has a motion block for a locally and temporally selected detection, and further comprising:

locally and temporally selected detection of a motion sequence of an object in the detection area, generating of an output signal, which is dependent on a prior detected motion sequence.

8. Method to control electrical devices according to claim 7, wherein the locally and temporally selected detection of a motion sequence takes place using sensing of changes of brightness values of an arrangement of photo diodes as a consequence of the motion sequence.

9. Method to control electrical devices according to claim 7, wherein with a brightness of the surrounding that falls below a pre-defined value, a defined optical noise is adjusted using a light source at least during the detection of the motion sequence.

10. Method to control electrical devices according to claim 7, wherein a distance block of the control device which performs the distance measurement is deactivated before the locally and temporally selected detection of the motion sequence in the detection area.

11. Method to control electrical devices according to claim 7, wherein the distance measurement takes place using pulsed light, and for the identification measurement and/or for the verification measurement respectively only one light pulse is used.

12. Method to control electrical devices according to claim 1, wherein the distance measurement takes place using pulsed light, and for the identification measurement and/or for the verification measurement respectively only one light pulse is used and wherein an optical detector of the control device comprises an arrangement of photodiodes, and this arrangement is used during the hibernating state of the control device to store electrical energy which is sufficient to carry out the control method at least up to the start of the measurement cycle.

* * * * *